W. L. R. EMMET.
SYSTEM OF POWER DISTRIBUTION.
APPLICATION FILED APR. 5, 1909.

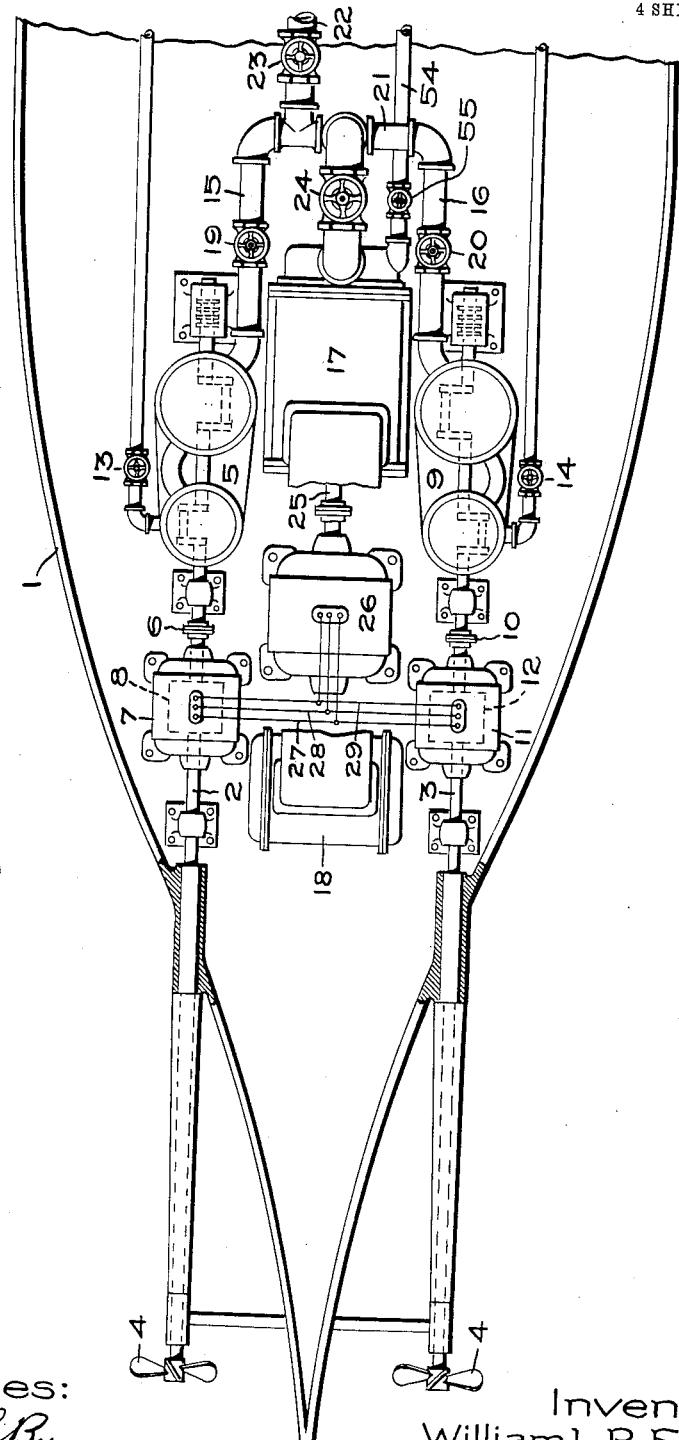

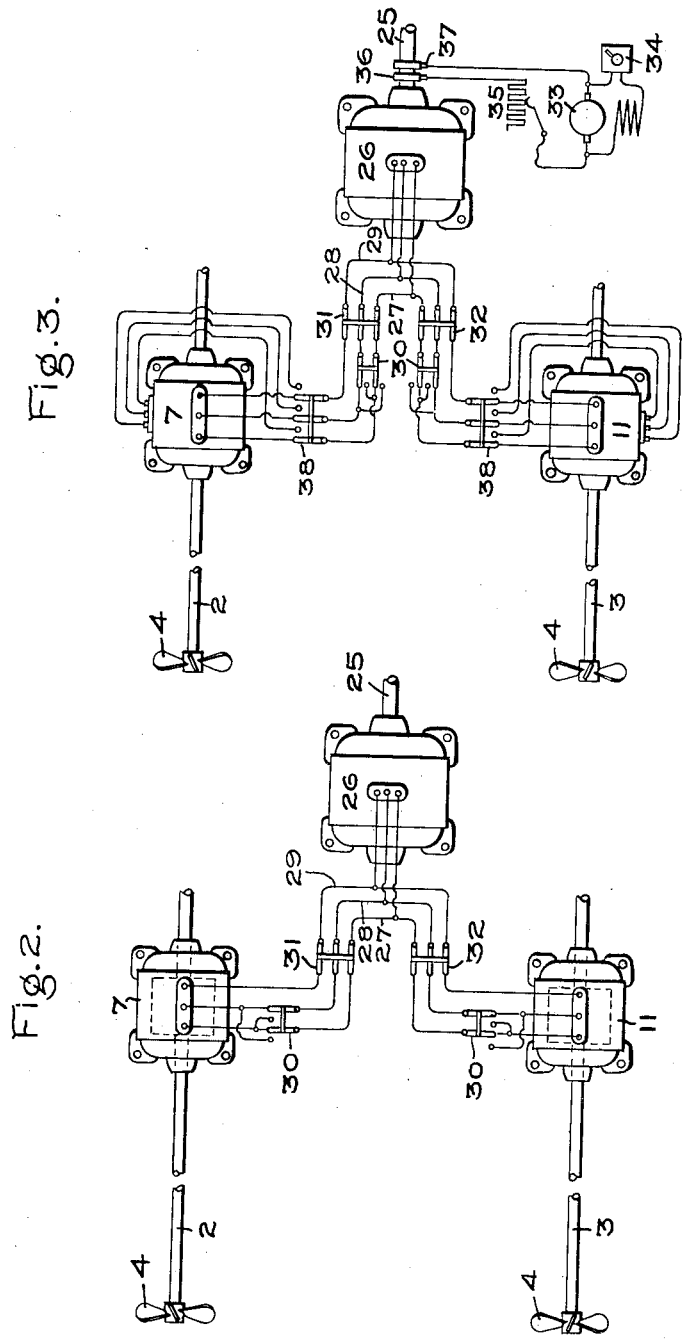

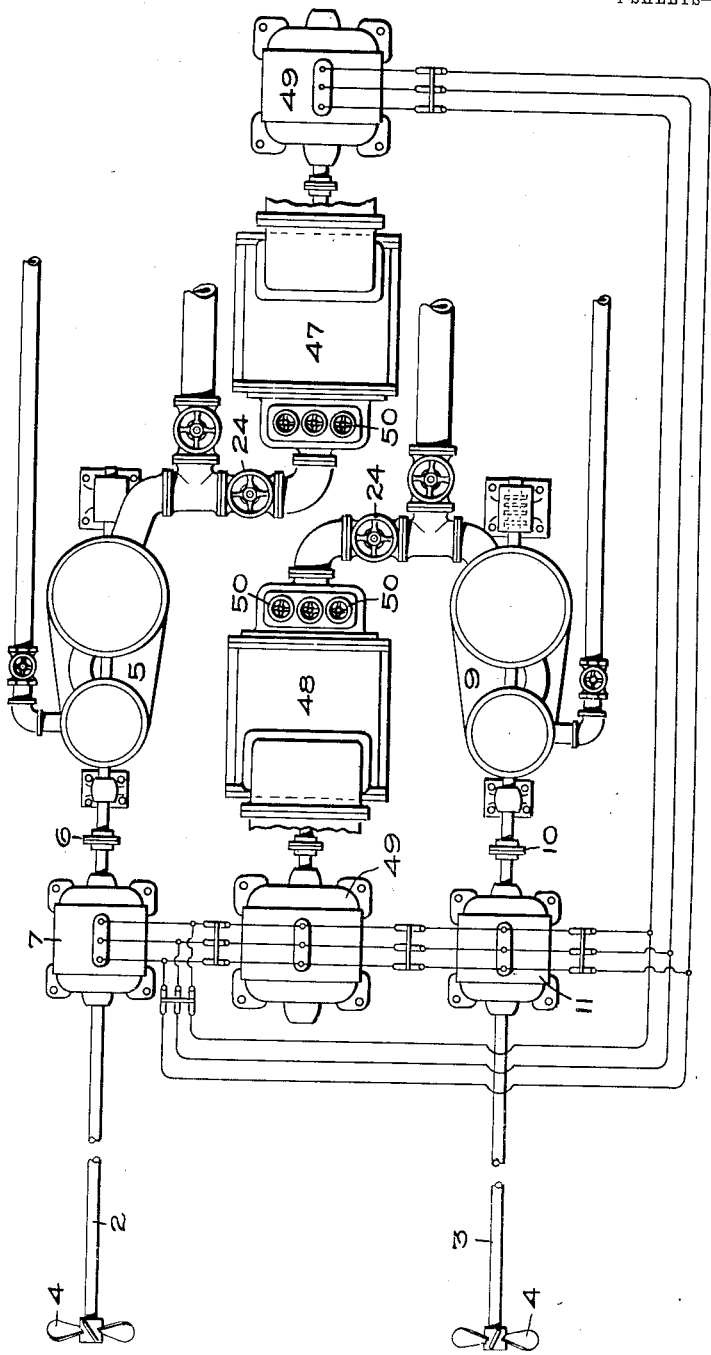

945,925.

Patented Jan. 11, 1910.
4 SHEETS—SHEET 4.

Witnesses:
Marcus L. Byng.
J. Ellis Glen.

Inventor:
William L. R. Emmet,
by
Att'y.

UNITED STATES PATENT OFFICE.

WILLIAM L. R. EMMET, OF SCHENECTADY, NEW YORK, ASSIGNOR TO GENERAL ELECTRIC COMPANY, A CORPORATION OF NEW YORK.

SYSTEM OF POWER DISTRIBUTION.

945,925.  Specification of Letters Patent.  Patented Jan. 11, 1910.

Application filed April 5, 1909. Serial No. 487,858.

*To all whom it may concern:*

Be it known that I, WILLIAM L. R. EMMET, a citizen of the United States, residing at Schenectady, in the county of Schenectady and State of New York, have invented certain new and useful Improvements in Systems of Power Distribution, of which the following is a specification.

The present invention relates to systems of power distribution, intended more especially for the propulsion of ships, wherein high pressure reciprocating engines, low pressure turbines, electrical generators and motors are employed to drive the propeller shafts.

The object of my invention is to improve the construction and arrangement of the parts of such a system together with a regulating mechanism of simple, reliable and rugged construction, whereby the speed of the vessel can be readily changed over a wide range and a high degree of economy in steam consumption preserved.

Figure 6:
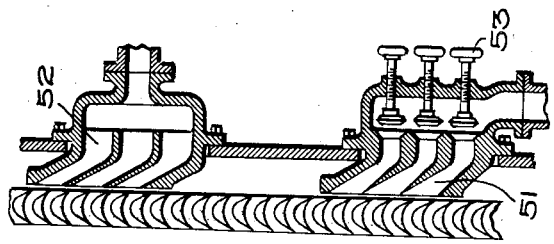
Figure 5:
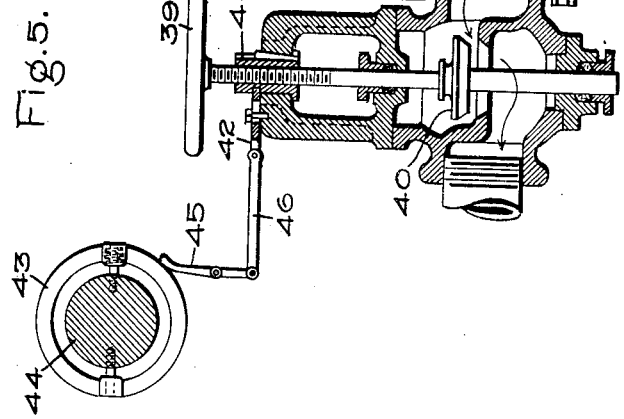

In the accompanying drawings which are illustrative of my invention, Figure 1 is a plan view, partially diagrammatic, of a vessel equipped with my improved apparatus; Fig. 2 is a diagram illustrating the circuits of an alternating current generator and its connected motors; Fig. 3 is a diagram illustrative of an arrangement whereby the natural speed relation between the generator and the motors may be changed; Fig. 4 is a diagrammatic view showing two high pressure reciprocating engines exhausting into two low pressure turbines; each turbine driving an electric generator; Fig. 5 is a detail view of an emergency speed governor and a combined throttle and emergency valve; and Fig. 6 is a detail view showing high and low pressure nozzles for a mixed pressure turbine.

I indicates the hull of the vessel having propeller shafts 2 and 3 supported by suitable bearings. Each shaft is provided with a propeller 4 of any suitable size, shape and construction, and adapted for the speed of the engines and motors. On the shaft 2, or on a continuation thereof, is a low speed high pressure reciprocating engine 5 having one, two or more cylinders whose pistons are connected to the main shaft by the usual rods and cranks. It is preferable to make the main shaft separate from the propeller shaft and connect it by a coupling 6 so that the engine can be cut out of service when desired and the propeller operated solely by the multiphase alternating current electric motor 7. The motor is carried by the frame or beams of the hull and the armature 8 is mounted directly on the shaft 2 or on a sleeve carried by said shaft. A similar arrangement is provided for the other propeller wherein 9 indicates the engine, 10 the coupling, 11 the electric motor and 12 its armature. These motors are constructed and organized to operate at the same speeds when receiving current from the same source.

Steam is admitted by mains to the engines from a boiler which for the sake of simplicity, has been omitted. Its entrance is controlled by the manually-actuated throttle valves 13 and 14. The exhaust from the engines passes through the conduits 15 and 16 to the low-pressure high speed turbine 17 and after performing work therein passes to the condenser 18 where it is condensed in the usual manner. In order to efficiently extract the energy from the steam the turbines are driven at a speed greatly in excess of that of the reciprocating engines. In the conduit 15 is a valve 19 so that when the engine 5 is cut out of service and the turbine is operating, either on exhaust steam from the other engine or on live steam or a mixture of both, steam cannot pass from the turbine to the engine, it being understood that under such conditions the valve is closed. The conduit 16 leading to the second engine is provided with a valve 20 for a similar purpose. The transverse conduit 21 connects the conduits 15 and 16 and is provided with an atmospheric outlet 22. In the outlet is a valve 23 that is normally closed but which is opened when the engines are operating and the low-pressure turbine is cut out of service. The admission of steam to the turbine is controlled by a governing mechanism which may be typified by the hand-operated throttle valve 24. Normally this valve is wide open. When closed the turbine is cut out of service and the exhaust from the engines escapes by outlet 22. When operating in this manner I may with advantage connect the outlet 22 to the condenser and disconnect the turbine from the condenser, or leave it connected, as best suits the requirements of operation. The turbine may be of any desired type or character. I have shown a Curtis multi-stage machine since this possesses many features of advantage in the way of high economy, relatively small weight for its output, simplicity of construction, etc. On the main shaft 25 of the turbine is an electric generator 26 of any approved construction. As shown it is of the multi-phase type generating three-phase alternating current and having a stationary armature and rotating field magnets. The field exciting current may be supplied from a suitable source, such for example as a separate exciter driven by a separate engine, or it may be driven by the turbine. Current from the generator is supplied in multiple to the motors 7 and 11 by conductors 27, 28 and 29. In practice the conductors will usually extend to a switchboard where suitable instruments, switches, etc., may be placed, and from there to the motors. In each motor circuit a reversing switch 30 is placed that is suitable for the type of motor whatever it may be. Such a switch is shown in Fig. 2, and its object is to change the direction of flow of the current through the motor in order to reverse the direction of rotation of the movable element. Moving the switch from one set of contacts to the other will cause this action.

The propeller shafts may be reversed by the reciprocating engines alone or both engines and motors may be used for the purpose. If desired to reverse by both engines and motors, the engines are reversed by operating their reversing gear and the motors by moving the switches 30. If desired to use the engines alone the motor circuits are opened by the switches 31 and 32 and the engines permitted to exhaust through the conduit 22 by opening the valve 23.

Referring to Fig. 3, 26 indicates an alternating current generator of the multiphase type and wound for a certain definite number of poles, for example, four. The field magnets form the rotating element and the exciting current therefor is supplied by the direct current exciter 33. In the field circuit of the exciter is a rheostat 34 for varying the field strength. In circuit with the mains leading from the exciter to the generator is an adjustable resistance 35 by means of which the exciting current can be varied so as to change the output of the generator. By reducing the field strength, I can reduce the core losses for light load conditions and thus improve the economy. Current enters the generator through revolving rings 36 and stationary brushes 37. By varying the field excitation of the generator I can improve the electrical efficiency under the conditions of varying load. I may also vary the excitation to limit the momentary flow of current when the reversing switch or pole changer in the motor circuit is operated. Each motor is wound for a certain number of poles, and may have a single winding with connections leading therefrom so that the number of poles can be changed say from eight to twelve or to any other number, or it may have separate windings, one winding arranged to give eight poles and the other twelve or any other member. Both of these are well known and the particular arrangement of windings on the motor is not essential to my invention. In order to change the natural speed relation between the generator and motor to improve the economy at certain speeds, I change the number of poles on the motor or on the generator or both. This is accomplished by means of a pole changer 38. With the pole changer arranged as shown the motor has eight poles, twice as many as the generator, and hence the speed of the generator will be twice the natural speed of the motor. Moving the pole changer to the right-hand set of contacts changes the number of active poles of the motor to twelve, or three times the number of poles on the generator, and the natural speed of the motor will be one-third that of the generator. It will thus be observed that by means of the pole changer I am able to materially vary the motor speed without changing the turbine speed. While changing from one number of poles to another of the motors I may open the circuits by switches 31, 32, or vary the excitation of the generators by the resistance 35 or both. In this figure the reversing switches 30 are employed as before.

In Fig. 4 is shown two high pressure low speed prime movers 5 and 9 direct connected to the propeller shafts and two low pressure high speed turbines 47 and 48. In this case each engine exhausts into one turbine, and the turbines are connected to the same or different condensers. Each low pressure turbine has a multiphase alternating current generator 49 which supplies current to the multiphase alternating current motors 7 and 11 on the propeller shafts. The generators are provided with suitable connections and switches whereby they may supply current in multiple to the motors, or each generator may supply its own motor independently. Again the starboard generator may supply current to the port motor and the port generator to the starboard motor. Pole changers may be used with these motors as well as with those previously described. Another important feature of advantage in this arrangement is that it is possible in case of emergency or otherwise to drive one propeller shaft by one high pressure prime mover or engine, the other shaft deriving its power from the low pressure turbine receiving the exhaust from said engine. In this case the other generator and motor are cut out of circuit by means of the switches shown. Such an arrangement would tend to overcome the loss of efficiency incident to very light loads corresponding to low speed of the vessel. This would be an economical operation for war vessels at cruising speeds. It also affords another and convenient method of operating in case of emergency when parts of the apparatus are not in working order.

Referring to Fig. 5, I have shown a combined emergency and throttle valve having a constant tendency to close and more especially intended for the turbine and so arranged that by operating the hand-wheel 39 the valve 40 can be opened and closed in the usual way. The stem is threaded into a sliding nut 41 that is normally held in the raised position by the sliding latch 42 but which when released by the latch will slide downward and permit the valve to seat automatically. 43 indicates a type of emergency governor comprising an unbalanced ring that is normally concentric with the turbine shaft 44 and moves into an eccentric position under a certain increase in speed, say 10%. When so moved against a spring or springs it strikes the trigger 45 which through the connecting rod 46 withdraws the support or latch 42 for the nut and lets it fall with the valve to its lowest position. This arrangement prevents injury to the turbine or generator in case the load is taken off suddenly or a circuit is broken. The valve is reset by rotating the hand wheel to the right thereby moving the nut up the stem until the notch in the nut registers with the position of the latch after which the latch is moved to the place and the valve opened like any screw valve by turning it to the left.

In order to adjust the pressure and therefore the distribution of work on the load between the high pressure engine and low pressure turbine one, two or more valves 50, Fig. 4, may be provided and operated by hand, or in response to pressure or speed conditions, or the valve 24 may be suitably adjusted by hand or automatically. By this means the inlet pressure of the turbine and the exhaust pressure of the engine can be adjusted.

In event of using high pressure steam in the turbine under emergency conditions or under heavy load conditions such as very high speed of the vessel, an auxiliary set of nozzles 51, Fig. 6, is provided that are only used when high pressure steam is admitted. These nozzles preferably have an enlargement or expansion between the throat and discharge end so as to materially reduce the pressure and thereby save the wheel casing from high pressure and to reduce rotation losses. 52 indicates the nozzles usually employed in supplying exhaust steam to the first row of wheel buckets. They may be expanding or non-expanding in character. One or both sets of nozzles may be provided with regulating valves 53. With such an arrangement suitably designed the total energy of steam from boiler pressure will be available in the first stage of the turbine where it will work with good efficiency and thus convert the low pressure turbine into a good high pressure machine. The turbine when arranged as described may be operated as a low pressure turbine, with live steam, or with a mixture of high pressure steam and exhaust steam from one or more engines.

It may happen that one or both engines may be temporarily out of commission in which case the couplings 6 and 10 Fig. 1 are opened to separate the parts of the shafts and the valves 13, 14, 19, 20 and 24 are closed. Live steam from the boiler may then be admitted to the turbine by the conduit 54 under the control of the throttle valve 55 or valves 53 or both.

When an engine is alone driving a propeller shaft it also drives the rotating element of a motor. As this will not as a general thing be for any protracted time the slight loss of power occasioned thereby can be disregarded. But if desired, under the conditions specified, the shaft may be permitted to rotate independently of said element by disconnecting the two and supporting said element.

In specifying that the movable element of the motor is on the propeller shaft it is to be understood that it can be placed anywhere thereon, and that broadly speaking the "propeller shaft" includes the engine shaft as well as the part extending through the hull.

In accordance with the provisions of the patent statutes, I have described the principle of operation of my invention, together with the apparatus which I now consider to represent the best embodiment thereof, but I desire to have it understood that the apparatus shown is only illusrative, and that the invention can be carried out by other means.

What I claim as new and desire to secure by Letters Patent of the United States, is,

1. In a power system for propelling ships, the combination of twin shafts, a propeller on each shaft, a low speed high pressure reciprocating engine on each shaft, a high speed low pressure turbine that is driven by the engine exhaust, an electric generator driven by the turbine, electric motors constructed and organized to operate at the same speed which are mounted one on each of the said shafts and coöperating with the engines to drive the shafts, and conductors conveying current from the generator to the motors in multiple.

2. In a power system for propelling ships, the combination of twin shafts, a propeller on each shaft, a low speed high pressure reciprocating engine on each shaft, a high speed low pressure turbine that is driven by the engine exhaust, an electric generator driven by the turbine, electric motors constructed and organized to operate at the same speed which are mounted one on each of the said shafts and coöperating with the engines to drive the shafts, conductors conveying current from the generator to the motors in multiple, and a reversing switch in the circuit of the conductors of each of the motors.

3. In a power system for propelling ships, the combination of a prime mover whose speed is low enough to satisfy the operating conditions, a shaft driven thereby, a turbine that receives and is operated by the exhaust from the prime mover and whose speed is in excess of that required to satisfy the operating conditions, an alternating current electric generator driven by the turbine and at the same speed, a motor organized and constructed to operate at a lower speed than the said generator from which it receives current, the movable element of the motor being mounted on and driving the shaft, and means for changing the natural speed relation between the generator and motor.

4. In a power system for propelling ships, the combination of a prime mover whose speed is low enough to satisfy the operating conditions, a shaft driven thereby, a turbine that receives and is operated by the exhaust from the prime mover and whose speed is in excess of that required to satisfy the operating conditions, a multiphase alternating current electric generator driven by the turbine and at the same speed, a multiphase electric motor organized and constructed to operate at a lower speed than the said generator from which it receives current, the movable element of the motor being mounted on the driven shaft, and a pole-changer for changing the number of active poles of the motor to vary the natural speed relation between the generator and motor.

5. In a power system for propelling ships, the combination of prime movers whose speeds are low enough to satisfy the operating conditions, twin shafts driven thereby, propellers on the shafts, turbine means that receive and operate on the exhaust from the prime movers and whose speed is in excess of that required to satisfy the operating conditions, alternating current electric generator means driven by the turbine and at the same speed, motors organized and constructed to operate at lower speeds than the said generator means from which they receive current, the movable element of each motor being mounted on a separate driven shaft, conductors connecting the motors in multiple, means governing the passage of motive fluid through the prime mover and turbine, and controlling means in the conductors for modifying the circuits of the motors.

6. In a power system, the combination of a prime mover, a power using shaft driven thereby, a turbine which receives and is normally operated by the exhaust from the prime mover, an electric generator driven thereby, a motor receiving current from the generator and whose movable element is mounted on the driven shaft, valve means for cutting off the supply of motive fluid to the prime mover, and means for supplying the turbine with motive fluid when the prime mover is not receiving motive fluid.

7. In a power system for propelling ships, the combination of independent low speed high pressure prime movers, independent twin propeller shafts driven thereby, a high speed low-pressure turbine that receives the exhaust from the prime movers and is operated thereby, a generator driven by the turbine, a means for varying the field excitation of the generator, a motor for assisting each prime mover to drive one of the driven shafts, current carrying conductors between the generator and motors, a coupling in the shaft between each motor and its coöperating prime mover so that the latter can be cut into and out of service, a reversing switch in each motor circuit, and means for admitting steam to the turbine from a separate source when the prime movers are idle.

8. A power plant for propelling ships comprising a propeller, a shaft therefor, a reciprocating engine for driving the shaft directly, a low-pressure high speed turbine that receives the exhaust from the engine and is operated thereby, a generator driven by the turbine, a means for varying the field excitation of the generator, a motor which receives current from the generator and whose movable member is mounted on and coöperates with the engine to drive the propeller shaft.

9. A power plant for propelling ships comprising a propeller, a shaft therefor, a relatively low speed prime mover for driving the shaft directly, a low pressure turbine that receives the exhaust from the prime mover and is operated thereby, a means for varying the distribution of the load between the prime mover and turbine, a generator driven by the turbine, means for varying the field excitation of the generator, and a motor receiving current from the generator whose movable member is mounted on and drives the propeller shaft.

10. A power plant for propelling ships comprising propellers, separate shafts therefor, high pressure prime movers, a low pressure turbine receiving and operated by the exhaust from the prime movers, a separately excited multiplane electric generator driven by the turbine, motors mounted on and driving the propeller shafts which receive current from the generator, reversing switch means in the motor circuits for reversing the direction of rotation of the movable elements of the motors, and a means for varying the field excitation of the generator.

11. A power plant for propelling ships comprising twin propellers, shafts therefor, high pressure prime movers, a low pressure turbine receiving and operated by the exhaust from the prime movers, a multiphase electric generator driven by the turbine, motors mounted on and driving the propeller shafts and which receive current from the generator, a reversing switch means in the motor circuit for reversing the direction of rotation of the movable element of the motor, a pole changer in the motor circuit, and a valve means for controlling the prime mover.

12. A power plant for propelling ships comprising propellers, twin shafts therefor, a prime mover for driving each shaft, a low pressure turbine receiving and operated by the exhaust steam from a prime mover, an electric generator driven by the turbine, a speed responsive device for shutting off the supply of motive fluid to the turbine when the speed is excessive, and electric motors mounted on and driving the propeller shafts which receive current from the generator and assist the prime movers.

13. In a power plant for propelling ships, the combination of propellers, twin shafts for driving them, a low speed high pressure engine on each shaft, a low speed alternating current multiphase motor mounted on each shaft and coöperating with an engine to drive said shaft, a high speed low pressure turbine receiving the engine exhaust, a multiphase generator driven by the turbine, conductors supplying current from the generator to the motors in multiple, a reversing switch in each motor circuit, and a pole changer in each motor circuit.

14. In a power plant, for propelling ships, the combination of propellers, twin shafts for driving them, a low speed high pressure engine on each shaft a low speed alternating current multiphase motor mounted on each shaft and coöperating with an engine to drive said shaft, a high speed low pressure turbine receiving the exhaust from each of the engines, a separate generator for each turbine, conductors connecting the generators and the motors in multiple, and switches in the conductors so arranged that either generator can supply current to the motors while the other generator is cut out of service.

15. In a power plant for propelling ships, the combination of a propeller, a driving shaft, therefor, a low speed engine on the shaft, a turbine receiving and operating on the exhaust from the engine, a means for admitting exhaust fluid to the turbine, a conduit for supplying live pressure fluid to the turbine for driving it, a means for reducing its pressure prior to acting on the rotating element of the turbine, an electric generator driven by the turbine, and a motor mounted on the propeller shaft and receiving current from the generator.

In witness whereof, I have hereunto set my hand this 2nd day of April, 1909.

WILLIAM L. R. EMMET.

Witnesses:
BENJAMIN B. HULL,
HELEN ORFORD.